July 16, 1968 SENZO IMAI 3,393,034
LIGHT TRANSMITTING PANEL
Filed May 21, 1965 6 Sheets-Sheet 1

July 16, 1968  SENZO IMAI  3,393,034
LIGHT TRANSMITTING PANEL
Filed May 21, 1965  6 Sheets-Sheet 2

July 16, 1968  SENZO IMAI  3,393,034
LIGHT TRANSMITTING PANEL

Filed May 21, 1965  6 Sheets-Sheet 6

United States Patent Office 3,393,034
Patented July 16, 1968

3,393,034
LIGHT TRANSMITTING PANEL
Senzo Imai, 746 Hashimoto Seta-cho,
Kurita-gun, Shiga, Japan
Filed May 21, 1965, Ser. No. 457,587
Claims priority, application Japan, May 25, 1964,
39/29,079
7 Claims. (Cl. 350—260)

ABSTRACT OF THE DISCLOSURE

The invention relates to a light transmitting panel capable of directing the light transmitted therethrough into a predetermined range for illuminating a desired area and simultaneously eliminating the glare portion of the light. According to the invention, a light transmitting panel comprises a pair of transparent plates each provided with a plurality of adjacent prisms, the surfaces of which are disposed at predetermined angles to form peaks and valleys, one of the plates having prisms with alternate opaque and transparent surfaces; said plates being assembled so that the prism surfaces of one plate face the corresponding prism surfaces of the other plate across a gap.

---

This invention relates generally to lighting devices and more particularly to a light transmitting panel or sheet which is capable of passing a predetermined portion of incident light while blocking the rest thereof.

In order to prevent the direct sun beams from coming into the rooms of buildings or houses or compartments of trains, ships, airplanes and the like, it has been customary to hang blinds of metal or opaque plastics material or comparatively thick cloth curtains on the windows. These shields are certainly effective in blocking the sun beams, but it becomes very dark and gloomy in the room and one cannot see outside through the windows. Accordingly, it is one object of the invention to provide a light transmitting panel which is capable of passing those light rays only which have a predetermined range of angles of incidence relative to the panel, while blocking those incident light rays which are outside the range.

In the field of illumination, the glare of a light source is one of the most serious and difficult problems technicians have encountered with. To take the headlights of motor vehicles for example, there has been a difficult problem of how to prevent dazzling and resulting blindness of pedestrians and drivers caused by the glare of headlights of meeting motor vehicles. Various arrangements have hitherto been proposed to solve the problem, but they have proven more or less unsatisfactory. Many motor vehicles, for example, are provided with such a dimmer arrangement that the headlight beams are directed downwards automatically or by control of the driver upon meeting of oncoming vehicles. Experience shows, however, that very often drivers do not use their dimmer arrangements, and that even when the headlight beams have been directed downwards or dimmed, there is still left a sufficient amount of glare to be irritating to the eyes of meeting drivers or pedestrians.

Drivers are obsessed also with too brilliant side-of-the-roadway illumination. For safe driving, it is desirable that such illumination should not cause undue strain or fatigue to their eyes.

The same problem arises in the field of static indoor illumination. There have been proposed various types of prismatic plates or panels which are adapted to be positioned in front of the light source. However, so far as the present inventor knows, generally they are very complicated in construction or cannot fully attain their intended objects in practice.

Accordingly, it is another object of the invention to provide a light transmitting panel or sheet which, with a light source positioned on one side thereof, is capable of directing the light transmitted therethrough into a predetermined range of useful directions for illuminating a desired area, eliminating all the glare portion of the light.

Another object of the invention is to provide such a light transmitting panel or sheet as aforesaid which is simple in construction, easy to manufacture and advantageously applicable in various lighting devices.

In order to accomplish the above objects, the invention provides a light transmitting panel comprising a pair of plates both made of transparent material and each provided on one side thereof with a plurality of rows of prisms each defined by a pair of faces extending inwardly of each of said plates at a predetermined angle relative to the other side thereof so as to form peaks and valleys of said prisms, one of said pair of faces of each said prism of one of said plates being opaque; said plates being assembled so that said peaks and valley of said prisms of each of said plates are disposed adjacent to said valleys and peaks of said prisms of the other plate, with said pair of faces of each said prism of each of said plates facing the corresponding pair of faces of each said prism of the other plate across a gap.

The invention will be more evident from the following description of the general principle and different embodiments thereof with reference to the accompanying drawings wherein;

FIG. 12b is a fragmentary front view of FIG. 12a;

FIG. 13 is a vertical sectional view of a blind employing panels of the invention;

FIG. 14 is a fragmentary front view of a panel adapted for use as a blind, window pane and the like;

FIG. 15 is a vertical sectional view of a panel of the invention adapted for use as a curtain which is able to be wound up;

FIG. 17a is a vertical sectional view of a headlight using as its front lens a panel of the invention;

FIG. 17b is a view similar to FIG. 17a, but showing the panel outwardly convexly curved and on an enlarged scale;

FIG. 25b is a transverse sectional view of FIG. 25a;

Figures 1, 2, 3A, 3B, 4:
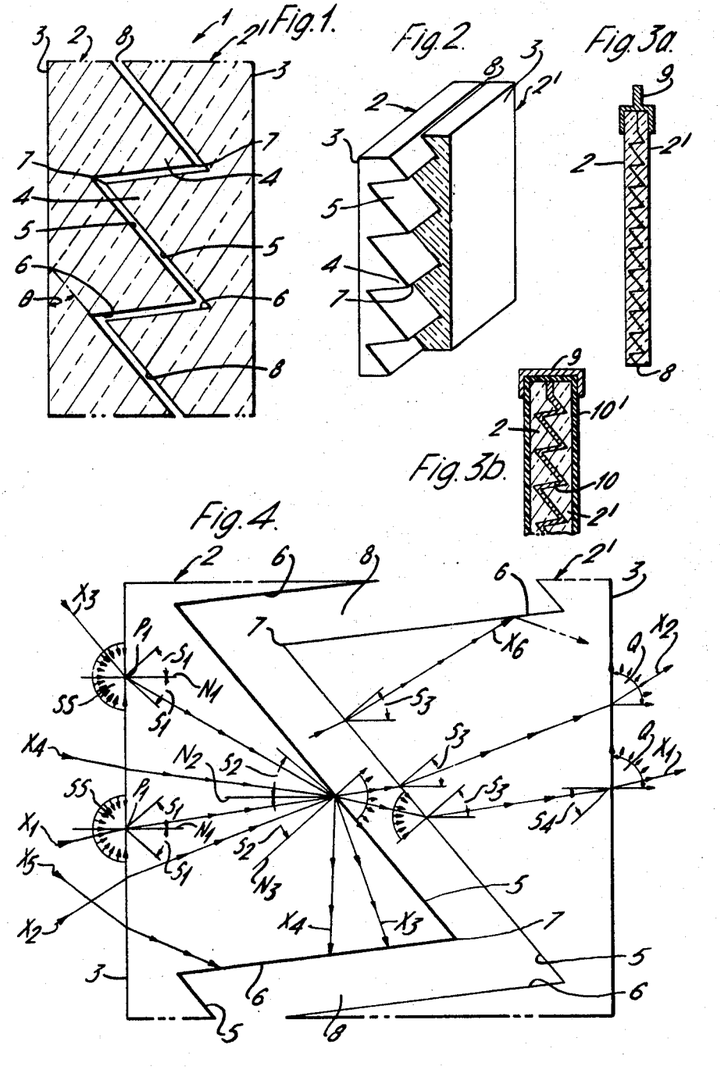
FIG. 1 is an enlarged vertical sectional view of a light transmitting panel of the invention.
FIG. 2 is a perspective view of the panel of FIG. 1, partly cut away to show its prisms.
FIG. 3a is a vertical sectional view of a panel of the invention with a sealing member.
FIG. 3b is a view similar to FIG. 3a, but showing the panel with protective cover plates.
FIG. 4 through 8 are schematic vertical sectional views of various forms of the panel of the invention, illustrating the principle of light refraction and transmission thereof.

Now referring in detail to the drawings, first to FIGS. 1 and 2, there is shown a panel generally designated 1 and comprising a pair of transparent plates or films generally designated 2 and 2', respectively, and made of glass or any other suitable plastic material. Each of the plates 2 and 2' is provided with a smooth side 3 extending the entire length and width of the plate and a figured side which comprises a plurality of rows of prisms 4 so elongated as to extend substantially the entire width of the plate. Each of these prisms 4 is provided with a pair of divergent sloping faces 5 and 6 which extend inwardly of the plate from an outer edge line 7, forming peaks and valleys of the prisms. The face 5 slopes comparatively gradually, making a predetermined angle $\theta$ with the plane of the smooth side 3 of the plate. The other face 6 of the prism may make any suitable angle with the plane of the side 3 of the plate, but in the illustrated embodiment it extends nearly perpendicularly to the side 3 in order to transmit as much light and at the same time to make the molding easy and the structure strong.

With their respective figured sides facing each other and one of the plates 2 and 2' being positioned upside down relative to the other, these two component plates 2 and 2' are put together so that the peaks of the prisms of each of the plates engage into the valleys of their corresponding prisms of the other plate, with a narrow gap 8 formed between the opposed faces of the prisms.

The presence of the gap 8 is essential for ensuring the prismatic function of the plates 2 and 2' when assembled. Experiments have disclosed that a very narrow gap is sufficient for the purposes of the invention and that even when the plates 2 and 2' have been pressed together with a considerably great force, a gap enough to ensure the prismatic function of the panel will be formed between the opposed faces of the prisms unless they have been conglutinated. The gap is filled with air or any other suitable gaseous material, which must be dry to prevent the faces of the prisms from becoming dim. To this end, the plates, when assembled, is preferably sealed at their peripheral edges by any suitable means such as an angled frame 9 as shown in FIG. 3a against vapor and also dust. Between the opposed faces of the prisms a sheet or film 10 of suitable transparent, softer material may be interposed for physical protection of the opposed faces of the prisms and reinforcement of the whole structure of the panel as shown in FIG. 3b. In this case, care must be taken that the faces of the prisms and opposed surfaces of the interposed material should not be conglutinated. With this arrangement, no particular sealing member may be required.

The steep face 6 of each of the prisms is made translucent or opaque, depending upon requirements. More strictly, the face 6 of each prism of the plate 2 and the opposed face 6 of each prism of the other plate 2' may both be made translucent, for example, frosted, or both of them may be made opaque; or one of them may be opaque while the other, translucent or reflective.

The panel may be of any thickness as occasions demand. The smooth sides 3 of the panel may be protected by a transparent cover 10' as shown in FIG. 3b.

Now will be the time to explain the principle of light refraction and transmission of the panel of the invention. Let it be assumed that the index of refraction of the material composing the plates 2 and 2' is approximately 1.55 and consequently the critical angle of refraction is approximately 40 degrees; and that each prism of the plates is so formed that the angle $\theta$ the prism face 5 makes with the plane of the smooth side 3 of the plates is the same as the critical angle. Suppose that the smooth side 3 of the plate 2 faces a light source. All points on the side receive light rays from all directions. Some of such points are typically shown as P1 in FIG. 4, and all the light rays directed to these points are schematically shown as included in a semicircular section SS. When such light rays enter the plate 2, they are bent towards the normal N1 perpendicular to the plane of the side 3 through the point P1. The degree of deviation of the light ray from the normal N1 is known as the angle of refraction, and the maximum value that the angle of refraction can have, that is, the critical angle has been assumed to be 40 degrees in the present case. Consequently, all the light rays that have entered the plate 2 at the point P1 are directed within a sector S1 defined by the critical angle at each side of the normal N1 and having its apex at the point P1.

Those light rays that have entered the plate 2 then impinge on all points of the faces 5 and 6 of the prism. Among these points, a typical one is taken for example and designated by P2. It will be easily understood that all the light rays within the plate directed to the point P2 are within a pair of sectors S2 each defined by the critical angle at each side of a normal N2 which is parallel to the normal N1 and extends through the point P2. The light rays, upon emerging from the face 5 of the prism into the gap 8, are deviated away from a normal N3 extending through the point P2 perpendicularly to the face 5 of the prism. Since, as previously mentioned, the face 5 of the prism so slopes as to make an angle of 40°, which is the same as the critical angle, with the side 3 of the plate 2, the normal N2 on the point P2 crosses the normal at 40°. Thus, all the light rays directed to the point P2 within the lower sector S2 such as rays X1 and X2 can emerge out of the face of the prism as they have smaller angles of incidence than the critical angle, but any light rays beyond this lower sector S2, that is, within the upper sector S2 such as rays X3 and X4 are reflected by the face 5 of the prism as they have greater angles of incidence than the critical angle. The reflected light rays are directed towards the other face 6 of the prism only to be blocked thereby if the face 6 is opaque. Those light rays which directly impinge upon the face 6 of the prism of the plate 2 such as ray X5 are also blocked by the face.

Those light rays that have been transmited from the face 5 of the prism of the plate 2 into the air gap 8 enter the opposed prism of the other plate 2', wherein they are refracted and directed within sectors S3 and S4 both defined by the critical angle and then emerge out of the smooth side 3 of the plate 2' as rays displaced a little from but parallel to the light rays incident on the side 3 of the plate 2 and directed within a quadrant Q. Those light rays which directly strike the other face 6 of the prism of the plate 2' such as ray X6 are blocked by the face if it is opaque.

If practical use requires, the face 6 of each prism of the plate 2' may be made translucent or reflective instead of opaque. In this case, the ray X6 is reflected by the face 6 and comes out of the panel in a downward direction. If the panel is used, for example, as a blind as will be described hereinafter, such downwardly directed light rays will not be objectionable to the purpose of the blind because they had upward directions when they struck the incident side of the panel and consequently have no glare, and because it is those incident light rays such as direct sun beams which have generally downward directions that should be cut off by the blind.

It will thus be seen that among all the light rays impinging on the side 3 of the plate 2 at different angles of incidence over a range of 180°, those having angles of incidence within the upper quadrant of the semicircle SS are blocked, while those which have angles of incidence within the lower quadrant pass through the panel. In other words, the panel, positioned vertically, can completely block all the light rays having downward directions from the horizontal, while permitting all the light rays directed upwardly from the horizontal to pass through the panel.

Within what range of incident angles are those light rays which pass through the panel or are blocked thereby? This is determined by the index of refraction of the material of the panel and the angle of the face 5 of the prism relative to the side 3 of the panel. In the above embodiment, the index of refraction has been as about 1.55 and and the angle $\theta$ of the prism face 5, as 40° degrees which is equal to the critical angle of refraction, with the result that those light rays which have angles of incidence within a range of 90 degrees are blocked. The same result will be obtained from a panel made of a different material having a different index of refraction, only if the angle $\theta$ is rendered equal to the critical angle of refraction of the material of the panel.

On the other hand, with the same index of refraction of the material composing the plates, it is possible to change the above mentioned range of angles of incident light rays that are blocked or pass through the panel by changing the angle $\theta$ of the prism face 5 relative to the side 3 of the plate. If the angle $\theta$ is greater than the critical angle, the range of the incident angles of the light rays that are blocked increases. In other words, a greater portion of incident light than in the case of FIG. 4 is blocked. On the contrary, if the angle $\theta$ is smaller than the critical angle, there will result a decrease in the range of the incident angles of the light rays that are blocked. In other words, a greater portion of incident light on the panel can pass therethrough. The circumstances are shown in FIGS. 5 and 6, wherein the air gap 8 between the opposed prisms is shown as a line for simplicity of illustration.

Figures 5, 6:
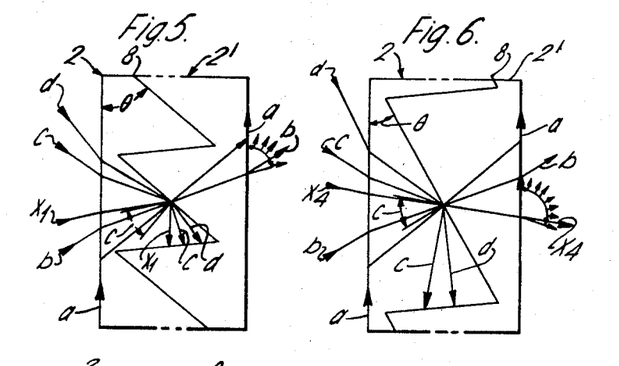

In FIG. 5 in which the angle $\theta$ is 50 degrees, light rays a and b, for example, can pass through the panel, whereas light rays c and d are blocked and also the light ray X1 which passed through the panel in the case of FIG. 4, because it now hits on the prism face 5 at an angle beyond the critical angle C. This means that in the case of FIG. 5 some incident light rays having upward directions are blocked as well as those light rays which have horizontal or downward directions.

In FIG. 6 in which the angle $\theta$ is 30 degrees, light rays c and d, for example, are blocked, whereas rays a and b pass through the panel and also the ray X4 which was blocked in the case of FIG. 4 now can pass therethrough, because it has now come to be within the critical angle C on the face 5 of the prism. This means that some incident light rays that have downward directions can pass through the panel as well as those light rays that have horizontal or upward directions.

Figures 7, 8, 9:
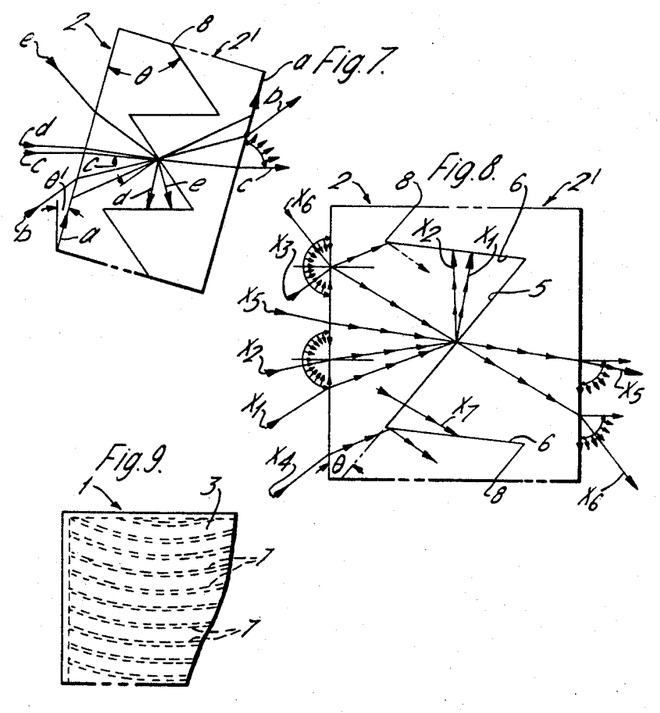
FIG 9 is a fragmentary front view of a different form of the panel of the invention.

FIG. 7 shows the panel inclined at a suitable angle $\theta'$ from its vertical position. Suppose that the material of the panel is the same as in the previous embodiments. If the angle $\theta$ of the prism face 5 is suitably selected, it is possible to obtain light rays emerging from the side opposite to the incident side of the panel in substantially the same range of directions as in the case where the panel is positioned vertically. As shown, those light rays having upward directions from the horizontal, such as rays a, b and c can be transmitted through the panel, whereas those in downward directions such as rays d and e are blocked.

In the previous embodiments, the arrangements are such that mainly those incident light rays which have downward directions from the horizontal are blocked. It will be easily understood that as shown in FIG. 8, if the prism face 5 shown schematically as a line in the drawing is inclined in the opposite direction, in other words, if the opposite side of the panel receives light, mainly those light rays which are incident on the panel in upward directions such as light rays X1 and X2 are blocked. In this case, the steep face 6 of the prism of the plate 2' at the incident side of the panel may be made reflective, for if any rays such as rays X3 and X4 hit on the reflective face, they will be reflected thereby and emerge out from the side of the other plate 2 in downward directions just as rays X5 and X6. However, the prism face 6 of the plate 2 at the light-departing side of the panel must be opaque in order to prevent any light rays such as ray X7 from coming out in upward directions.

Although in FIG. 2 the peak lines 7 of the prisms 4 extend straight, they may extend arcuately as shown in FIG. 9, or in any other ways.

Figure 10:
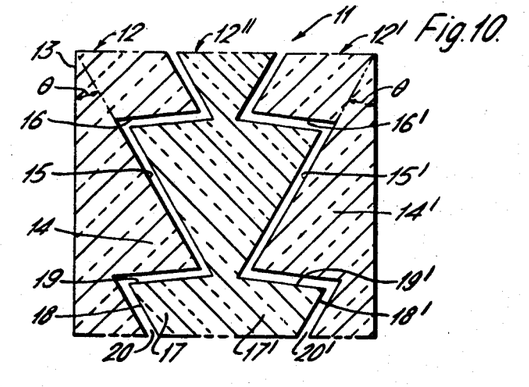
FIG. 10 is an enlarged vertical sectional view of still another form of the panel of the invention.
Figure 11:
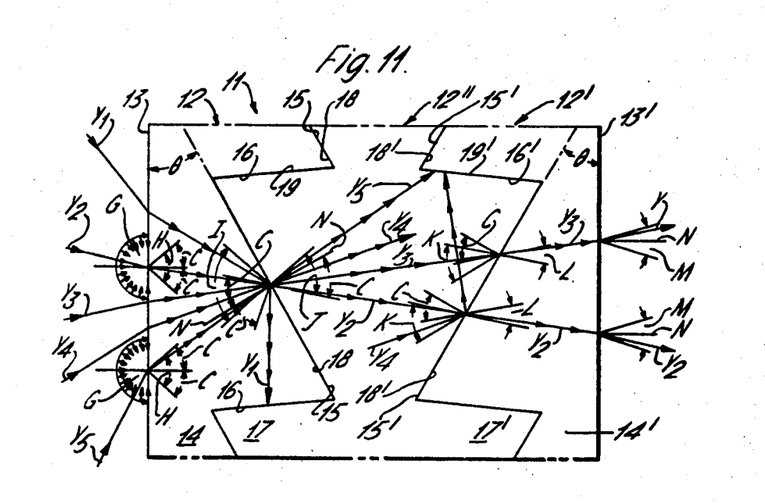
FIG. 11 is a schematic vertical sectional view of the panel of FIG. 10, illustrating the light refraction and transmission thereof.

FIG. 10 shows another embodiment of the invention. The panel 11 comprises a pair of opposed plates 12, 12' of the same construction, with an intermediate plate 12'' interposed therebetween. Each plate 12, 12' is provided with a smooth side 13, 13' and a figured side comprising a plurality of rows of elongated prisms 14, 14' defined by a pair of faces 15, 15' and 16, 16' and extending substantially the entire width of the plate. The face 15, 15' slopes comparatively gradually, making a predetermined angle $\theta$ with the plane of the smooth side 13, 13' of the plate, while the other face 16, 16' extends substantially perpendicularly to the smooth side of the plate, although it may make any other suitable angle therewith. The intermediate plate 12'' has its opposite sides formed with a plurality of prisms 17, 17' defined by a pair of faces 18, 18' and 19, 19' corresponding to the faces 15, 15' and 16, 16' of the prisms 14, 14'. Between the plates 12 and 12' opposed so that their respective figured sides face symmetrically with each other, the intermediate plate 12'' is interposed so that the peaks and valleys of its prisms 17, 17' are disposed adjacent to those of the corresponding prisms 14, 14' of the opposed plates 12 and 12', with a narrow gap 20, 20' formed therebetween. The prism faces 19, 19' of the intermediate plate 12'' must be opaque, while the prism faces 16, 16' of the plates 12, 12' may be opaque, translucent, or transparent. FIG. 11 schematically shows the panel of FIG. 10. Here, the air gaps are shown as a line for simplicity of illustration and explanation, and the reference symbols G, H, I, J, K, L and M designate the maximum ranges of angles of incidence or refraction the light rays can have at any given points on the side surfaces 13, 13' of the plates 12, 12' and the inclined faces 15, 15' 18 and 18' of the prisms of the plates 12, 12' and 12'', and the symbol N represents normal lines perpendicular to the corresponding faces of the prisms through such points as above described.

Referring to FIGS. 10 and 11, the incident side 13 of the panel receives light rays in all directions within a range of 180 degrees. Such light rays enter the plate 12 and hit on the inclined face 15 of the prism 14. If the angles the light rays make with normal N are greater than the critical angle C, they are reflected on the face to be directed towards the other face 16 only to be blocked thereby if this face is opaque, such as ray Y1. On the contrary, if the angles they make with the normal N on the face are smaller than the critical angle C, they pass through the face and enter the intermediate plate 12'', such as rays Y2, Y3, Y4 and Y5. The rays Y2 and Y3 impinge on the face 18' of the opposed prism 17' of the plate 12'' at an incident angle smaller than the critical angle C, so that they pass into the plate 12' and then emerge out therefrom as rays a little displaced from, but parallel to, the corresponding incident rays. The ray Y4 hits on the face 18' of the prism 17' at an angle greater than the critical angle C, so that it is reflected thereby only to be blocked by the face 19' of the prism; while the ray Y5 hits directly on the face 19′ to be blocked thereby. Thus, among all light rays having different angles of incidence over a range of 180 degrees, those light rays which have passed through the panel have angles of departure within a limited range as shown by a sector M in the illustrated embodiment, and the same is true when light is incident on the opposite side 13′ of the panel.

Figure 12A:
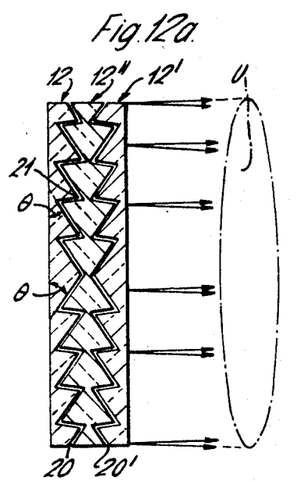
FIG. 12a is a vertical sectional view of a modification of FIG. 10.
Figures 12B, 13:
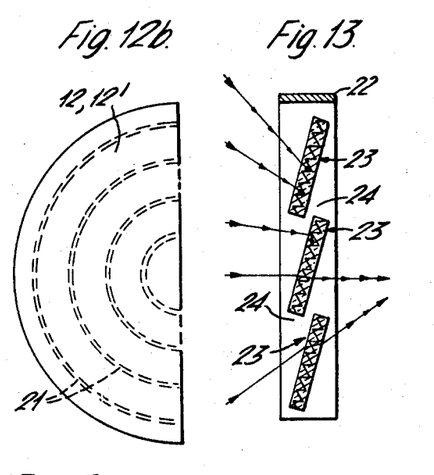

The range of angles of the light rays that pass through the panel depends upon the index of refraction of the material composing the panel and the angle $\theta$ of the inclined face of each prism relative to the side 13, 13′ of the plate 12, 12′. If the angle $\theta$ is greater than the critical angle of refraction of the material, no incident light can pass through the panel, while the smaller than the critical angle the angle $\theta$ is, the greater is the range of angles at which the light rays depart from the panel. In the illustrated embodiment of FIGS. 10 and 11, the index of refraction of the material comprising the plates 12, 12′ and 12″ is the same as before and the angle $\theta$ is 30 degrees, with the result that the light rays that can pass through the panel are substantially limited within the sector M defined by an angle of a little greater than 15 degrees at each side of the normal N. If the prisms are so formed that their edge lines 21 become concentric as shown in FIG. 12b with the angle $\theta$ of the prism face very close to the critical angle, the panel may advantageously be used in front of a light source to obtain a substantially cylindrically defined bundle of light rays U like a spot light.

Some applications of the panel of the invention will now be described. In FIG. 13, there is shown a blind comprising a frame 22 of rectangular shape and a plurality of elongated rectangular panels 23 of the construction shown in FIG. 8 extending the width of the frame. These panels are suitably inclined and spaced one above another. It will be easily seen that the panels prevent those incident light rays which have generally downward directions such as direct sun beams from passing therethrough while permitting those light rays which have generally upward directions to pass therethrough. This means that inside the blind it will not become dark and persons in the room can see things outside through the blind. The gaps 24 between adjacent panels serve for ventilation.

Figures 14, 15, 17A, 17B:
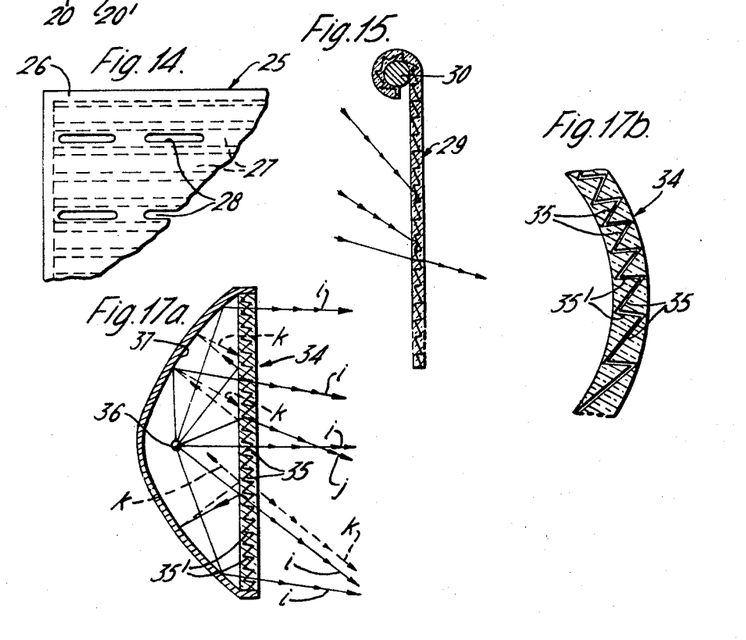

FIG. 14 shows a panel 25 intended for use as a window pane, blind and the like. The panel is not occupied at its peripheral portions 26 by the rows of prisms 27, and has a plurality of horizontally extending slits 28 for ventilation.

Figures 16, 18, 19, 20, 21:
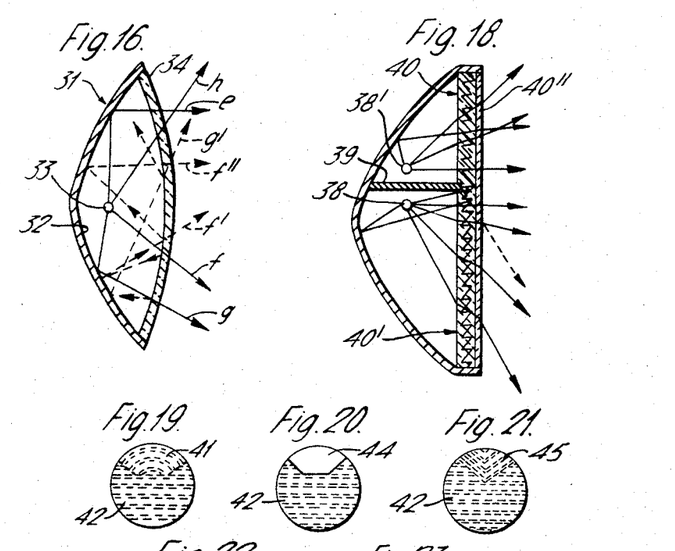
FIG. 16 is a vertical sectional view of a conventional vehicle headlight.
FIG. 18 is a view similar to FIG. 17a, but showing two light sources provided in the headlight.
FIGS. 19 through 23 are front views of five different front lenses for vehicle headlights utilizing the panel of the invention.

In FIG. 15, the panel 29 is made of flexible material and is comparatively thin so that it can be wound up around a rod 30. The panel of the invention is advantageously used also as the front lens of the headlights of vehicles. As previously mentioned, one of the most serious and difficult problems of vehicle headlights is how to prevent glare. FIG. 16 shows a conventional headlight in vertical section, generally designated by 31 and comprising a parabolic reflector 32, a light source 33 and a conventional lens 34 placed in front thereof. Light rays $e$, $f$ and $g$ are directed horizontally or downwards. However, portions of such light rays are reflected on the inner surface of the front lens and then the reflector so as to advance in upward directions, such as rays $f'$, $f''$ and $g'$. It has been found that such light rays, as well as other upwardly directed direct light rays such as ray $h$, cause glare to the eyes. Such glare portions of light can be completely eliminated by using a panel of the invention as the front lens of a headlight.

As shown in FIG. 17a, the lens 34 has its prism faces 35 so inclined as to transmit those light rays which have downward directions, as in FIG. 8. The light rays that are emitted from the source 36 impinge on the inner surface of the lens 34 directly or after being reflected by the inner surface of the lens and the parabolic reflector 37 once or many times. Among those light rays, those which have horizontal or downward directions pass through the lens and advance in the same directions as before, such as rays $i$, while those which have upward directions are block by the faces 35′ of the prisms if it is opaque, or reflected by the faces 35′ if it is reflective so as to emerge out from the lens in downward directions, such as ray $j$. The same is true with those light rays such as rays $k$ which are reflected by the inner surface of the lens 34 and the reflector 37 and then enter the lens. Thus, all the glaring light rays enamated from the source that have upward directions are completely blocked, with the result that all light rays that have been transmitted from the panel have horizontal or downward directions. The lens may be inclined or outwardly convexly curved, as shown in FIG. 17b. In this case, the prisms are of different shapes, with their respective faces differently inclined.

In FIG. 18, the hadlight is provided with a main light source 38 and an auxiliary light source 38′ thereabove. These pair of light sources are operated individually and separated by an opaque plate 39 having upper and lower reflective surfaces. The lens comprises two portions 40 and 40′, the upper portion 40 of which in front of the auxiliary light source has its prism faces so inclined as to transmit those light rays which have upward directions, while the lower portion 40′ of the lens in front of the main light source has its prism faces so inclined as to pass those light rays which have horizontal or downward directions. The lens may be covered by a protective transparent plate 40″. The driver may turn off the auxiliary light 38′ when meeting oncoming vehicles, to eliminate irritating glare of his headlights which would otherwise dazzle the drivers of the meeting vehicles.

Figure 22:
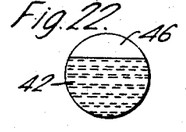
Figure 23:
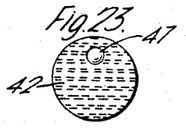
Figure 24:
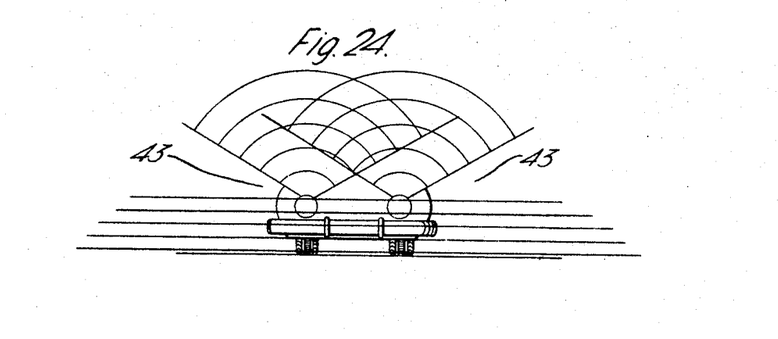
FIG. 24 is a schematic view of the light distribution of the headlights of a motor vehicle, utilizing the front lens of FIG. 21.

FIGS. 19 through 23 show some other modified forms of the front lens of vehicle headlights, employing the panel of the invention. In FIG. 19, the upper portion 41 of the lens 42 has its prisms curved arcuately, with their faces inclined so that the light rays emitted therefrom are directed upwardly, while the lower proportion of the lens 42 has its prism faces oppositely inclined so that the light rays passing therethrough are directed in horizontal or downward directions. In FIG. 20 the lens has its upper portion comprising a sector-shaped ordinary light transmitting plate 44. In this case, a double-light-source arrangement similar to that of FIG. 18 may be required. In FIG. 21 the sector portion of FIG. 20 is replaced by a panel 46 of the invention having its rows of prisms arranged in V-shape. The light distribution of such headlights as viewed in front of them will be as schematically shown in FIG. 24. At each side of the headlights there will be formed a somewhat triangular dark space 43 wherein there are no light rays which would cause glare to the eyes of pedestrians or drivers of meeting vehicles. In FIG. 22 the upper portion of the lens 42 comprises an ordinary frosted glass plate 46, so that the light passing therethrough has lost its glare. In FIG. 23 the lens 42 is provided at its central portion with a small lens 47 for casting a comparatively small bundle of light rays onto a spot a long distance away, so that pedestrians or drivers of meeting vehicles, who have come to be off the direction of the bundle of light rays as they approach the light source, feel no glare in the eyes any longer.

Figure 25A:
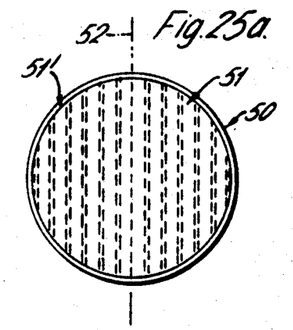
FIG. 25a is a front view of a beacon light utilizing the panel of the invention.
Figure 25B:
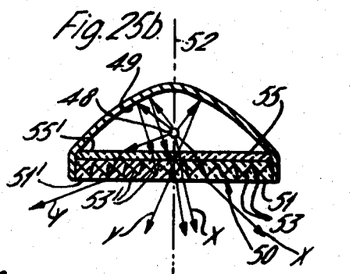
Figure 26:
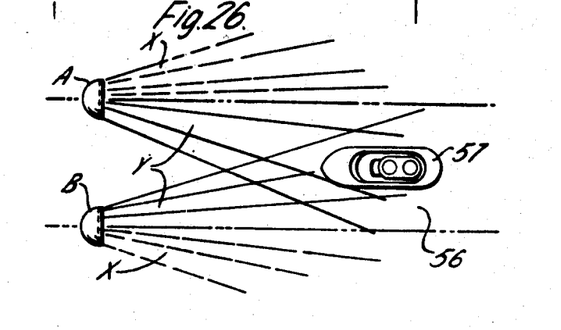
FIG. 26 is a schematic top plan view of light distribution circumstances of a pair of beacon lights as shown in FIGS. 25a and 25b.

FIGS. 25a and 25b shows a beacon light, in front elevation and transverse section, which comprises a light source 48, a parabolic reflector 49 and a front lens 50. The lens comprises two portions 51, 51′ at opposite sides of the center line 52. The right-hand portion 51 has its prisms arranged vetrically and in parallel with each other, and the faces 53 of the prisms are so inclined as to emit light rays X in rightward directions only from the center, while the left-hand portion 51′ of the lens has its prisms also arranged vertically and in parallel with each other, but the faces 53′ of these prisms are so inclined as to emit light rays Y in leftward directions only from the center. The two portions of the lens panel may be differently colored, for example, in red and green or covered by a red and green filter 55 and 55′, respectively. As shown in FIG. 26, a pair of beacon lights A and B of the above-described construction may be provided at the opposite sides of a navigation courses or air strip 56 so that within the course or strip green light rays Y are cast, while outside the course red light rays X pass. So long as a pilot of a ship 57 or airplane see the green light, he is steering the right course.

Figure 27:
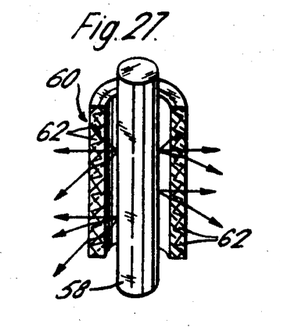
FIG. 27 is a perspective view, partly in vertical section, of an illumination lamp for indoor or outdoor use, utilizing the panel of the invention.
Figure 28:
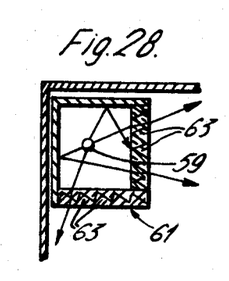
FIG. 28 is a vertical sectional view of an illumination lamp similar to that shown in FIG. 27.

Some examples of indoor illumination are shown in FIGS. 27 and 28, wherein light sources 58 and 59 are covered by differently arranged panels 60 and 61 of the invention. It will be easily understood that different distributions of indirect light may be obtained from different arrangements of the prisms 62, 63 of the panels.

It should be recognized that the embodiments disclosed herein are merely illustrative and changes and modifications will be made without departing from the true scope of the invention as claimed in the appended claims.

What I claim is:

1. A light transmitting panel comprising a pair of plates both made of transparent material; each provided on one side thereof with a plurality of rows of prisms each defined by a pair of faces extending inwardly of each said plates at a predetermined angle relative to the other side thereof so as to form peaks aand valleys of said prisms, one of said pair of faces of each said prism of one of said plates being opaque; said plates being assembled so that said peaks and valleys of said prisms of each of said plates are disposed adjacent to said valleys and peaks of said prisms of the other plate, with said pair of faces of each said prism of each said plates facing the corresponding pair of faces of each said prism of the other plate across a gap; and wherein said pair of plates are formed with slots therein for ventilation.

2. A light transmitting panel comprising a pair of plates and an intermediate plate placed therebetween, all made of transparent material, each of said pair of plates being provided on one side thereof with a plurality of rows of prisms each defined by a pair of faces extending inwardly of each said pair of plates at a predetermined angle relative to the other side of each of said pair of plates so as to form peaks and valleys of said prisms, said intermediate plate being provided at opposite sides thereof with a plurality of prisms each defined by a pair of faces corresponding to said pair of faces of each said prism of said pair of plates so as to form peaks and valleys of the prisms, one of said pair of faces of each said prism on each side of said intermediate plate being opaque; said pair of plates being opposed symmetrically with each other, with said intermediate plate interposed therebetween so that said peaks and valleys of said prisms of each said pair of plates are disposed adjacent to those said corresponding prisms on one of said opposite sides of said intermediate plate, with a gap formed between the opposed faces of said prisms of said intermediate plate and each of said pair of plates.

3. A light transmitting panel as recited in claim 2 wherein said rows of prisms run straight and in parallel with one another.

4. A light transmitting panel as recited in claim 2 wherein said rows of prisms run concentrically.

5. A light transmitting panel as recited in claim 2, wherein a transparent material is placed in each of said gaps.

6. A light transmitting panel as recited in claim 2 wherein a protective transparent plate covers at least one of the opposite side surfaces of the panel.

7. A light transmitting panel as recited in claim 2 wherein said plates are sealed at their periphery to prevent vapor and dust coming into said gaps.

References Cited

UNITED STATES PATENTS

| | | | |
|---|---|---|---|
| 631,220 | 8/1899 | Manning | 350—263 |
| 719,066 | 1/1903 | Wadsworth | 350—260 |
| 720,138 | 2/1903 | Hartung | 350—261 |
| 737,979 | 9/1903 | Wadsworth | 350—261 |
| 2,281,524 | 4/1942 | Meyers | 350—260 |
| 2,858,734 | 11/1958 | Boyd | 350—260 |
| 2,976,759 | 3/1961 | Bleuer | 350—260 |
| 3,213,753 | 10/1965 | Rogers. | |
| 3,254,556 | 6/1966 | Staunton | 350—286 |
| 3,255,665 | 6/1966 | Weiher et al. | 350—262 |

FOREIGN PATENTS

| | | |
|---|---|---|
| 16,568 | 1897 | Great Britain. |
| 429,340 | 5/1935 | Great Britain. |

JULIA E. COINER, *Primary Examiner.*